(12) United States Patent
Zhu et al.

(10) Patent No.: US 10,275,077 B2
(45) Date of Patent: Apr. 30, 2019

(54) TOUCH CONTROL DISPLAY PANEL, TOUCH CONTROL DISPLAY DEVICE AND DRIVING METHOD

(71) Applicants: Xiamen Tianma Micro-Electronics Co., Ltd., Xiamen (CN); Tianma Micro-Electronics Co., Ltd., Shenzhen (CN)

(72) Inventors: Yuanzhang Zhu, Xiamen (CN); Kangpeng Yang, Xiamen (CN); Yumin Xu, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 189 days.

(21) Appl. No.: 15/440,481

(22) Filed: Feb. 23, 2017

(65) Prior Publication Data

US 2017/0160867 A1 Jun. 8, 2017

(30) Foreign Application Priority Data

Nov. 9, 2016 (CN) .......................... 2016 1 0985207

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04102* (2013.01)

(58) Field of Classification Search
CPC ...... G06F 3/0416; G06F 3/044; G06F 3/0412; G06F 2203/04102
See application file for complete search history.

(56) References Cited

U.S. PATENT DOCUMENTS

| | | | |
|---|---|---|---|
| 2012/0062511 A1* | 3/2012 | Ishizaki | G06F 3/044 345/174 |
| 2013/0057495 A1* | 3/2013 | Wang | G06F 3/044 345/173 |
| 2013/0241868 A1* | 9/2013 | Kim | G09G 3/3685 345/174 |
| 2014/0152616 A1* | 6/2014 | Kida | G06F 3/0418 345/174 |

(Continued)

*Primary Examiner* — Ariel A Balaoing
(74) *Attorney, Agent, or Firm* — Anova Law Group, PLLC

(57) ABSTRACT

A touch control display panel, a touch control display device and a driving method are provided. The touch control display panel comprises a color film substrate including touch sensing electrodes and touch sensing signal lines electrically connected to the touch sensing electrodes, respectively; and an array substrate arranged opposite to the color film substrate and including a driving IC chip and a signal conversion unit. The signal conversion unit includes input terminals and output terminals. The input terminals are electrically connected to the touch sensing signal lines, respectively. The output terminals are electrically connected to the driving IC chip. The signal conversion unit combines a plurality of input signals received at the input terminals into a plurality of output signals, and transmits the output signals to the output terminals, respectively.

20 Claims, 7 Drawing Sheets

(56) References Cited

U.S. PATENT DOCUMENTS

| | | | |
|---|---|---|---|
| 2015/0177885 A1* | 6/2015 | Noto | G06F 3/044 |
| | | | 345/174 |
| 2015/0179133 A1* | 6/2015 | Lee | G06F 3/044 |
| | | | 345/174 |
| 2015/0253926 A1* | 9/2015 | Ota | G06F 3/0412 |
| | | | 345/174 |
| 2015/0338956 A1* | 11/2015 | Ikeda | H05K 1/0298 |
| | | | 345/174 |

* cited by examiner

TOUCH CONTROL DISPLAY PANEL, TOUCH CONTROL DISPLAY DEVICE AND DRIVING METHOD

CROSS-REFERENCES TO RELATED APPLICATIONS

This application claims the priority of Chinese Patent Application No. CN201610985207.8, filed on Nov. 9, 2016. the entire contents of which are incorporated herein by reference.

FIELD OF THE DISCLOSURE

The present disclosure generally relates to the display technology and, more particularly, relates to a touch control display panel, a touch control display device, and a driving method thereof.

BACKGROUND

Based on the operating principle, touch control display panels can be categorized into a self-capacitance type and a mutual capacitance type. In the existing mutual capacitance type touch control display panels, the mutual capacitance is often formed between a touch driving electrode and a touch sensing electrode. By measuring a change in electric charge of the mutual capacitance, a touch point may be detected.

In the driving structure of the mutual capacitance type touch control display panel, each touch sensing electrode is electrically connected to a touch sensing signal line, which transmits a touch sensing signal returned from the touch sensing electrode to a driving integrated circuit (IC) chip for further processing. Because the touch control display panel includes a plurality of touch sensing electrodes, a plurality of touch sensing signal lines are required, however, the driving IC chip often has limited number of signal interfaces. The data carried by the touch sensing signal lines is often processed by a touch control IC chip before being sent the driving IC chip through a limited number of signal interfaces. The demand for the touch control IC chip increases the cost of the touch control display panel. When the touch control IC chip has to be bonded with a flexible circuit board, bonding faults are likely to occur.

The disclosed touch control display panel, touch control display device, and driving method are directed to solve one or more problems set forth above and other problems.

BRIEF SUMMARY OF THE DISCLOSURE

One aspect of the present disclosure provides a touch control display panel. The touch control display panel comprises a color film substrate including a plurality of touch sensing electrodes and a plurality of touch sensing signal lines electrically connected to the plurality of the touch sensing electrodes, respectively; and an array substrate arranged opposite to the color film substrate and including a driving IC chip and a signal conversion unit. The signal conversion unit includes a plurality of input terminals and a plurality of output terminals. The plurality of input terminals are electrically connected to the plurality of the touch sensing signal lines, respectively. The plurality of output terminals are electrically connected to the driving IC chip. The signal conversion unit combines a plurality of input signals received at the plurality of the input terminals into a plurality of output signals, and transmits the plurality of output signals to the plurality of the output terminals, respectively.

Another aspect of the present disclosure provides a driving method a touch control display panel comprising: a color film substrate including a plurality of touch sensing electrodes and a plurality of touch sensing signal lines electrically connected to the plurality of the touch sensing electrodes, respectively; and an array substrate arranged opposite to the color film substrate and including a driving IC chip and a signal conversion unit, wherein the signal conversion unit includes a plurality of input terminals and a plurality of output terminals, the plurality of input terminals are electrically connected to the plurality of the touch sensing signal lines, respectively, the plurality of output terminals are electrically connected to the driving IC chip, and the signal conversion unit combines a plurality of input signals received at the plurality of the input terminals into a plurality of output signals, and transmits the plurality of output signals to the plurality of the output terminals, respectively, the driving method comprising: in a display stage, disconnecting the touch sensing signal lines from the corresponding output terminals of the signal conversion unit; and in a touch stage, sequentially connecting the touch sensing signal lines with the corresponding output terminals of the signal conversion unit, and receiving a plurality of signals returned from the touch sensing electrodes via the plurality of the output terminals.

Another aspect of the present disclosure provides a touch control display device, comprising the disclosed touch control display panel.

Other aspects of the present disclosure can be understood by those skillet in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention. In addition, it should also be noted that, for ease of description, only part, but not all, of the structures associated with the present invention are shown in the accompanying drawings.

Figure 1:
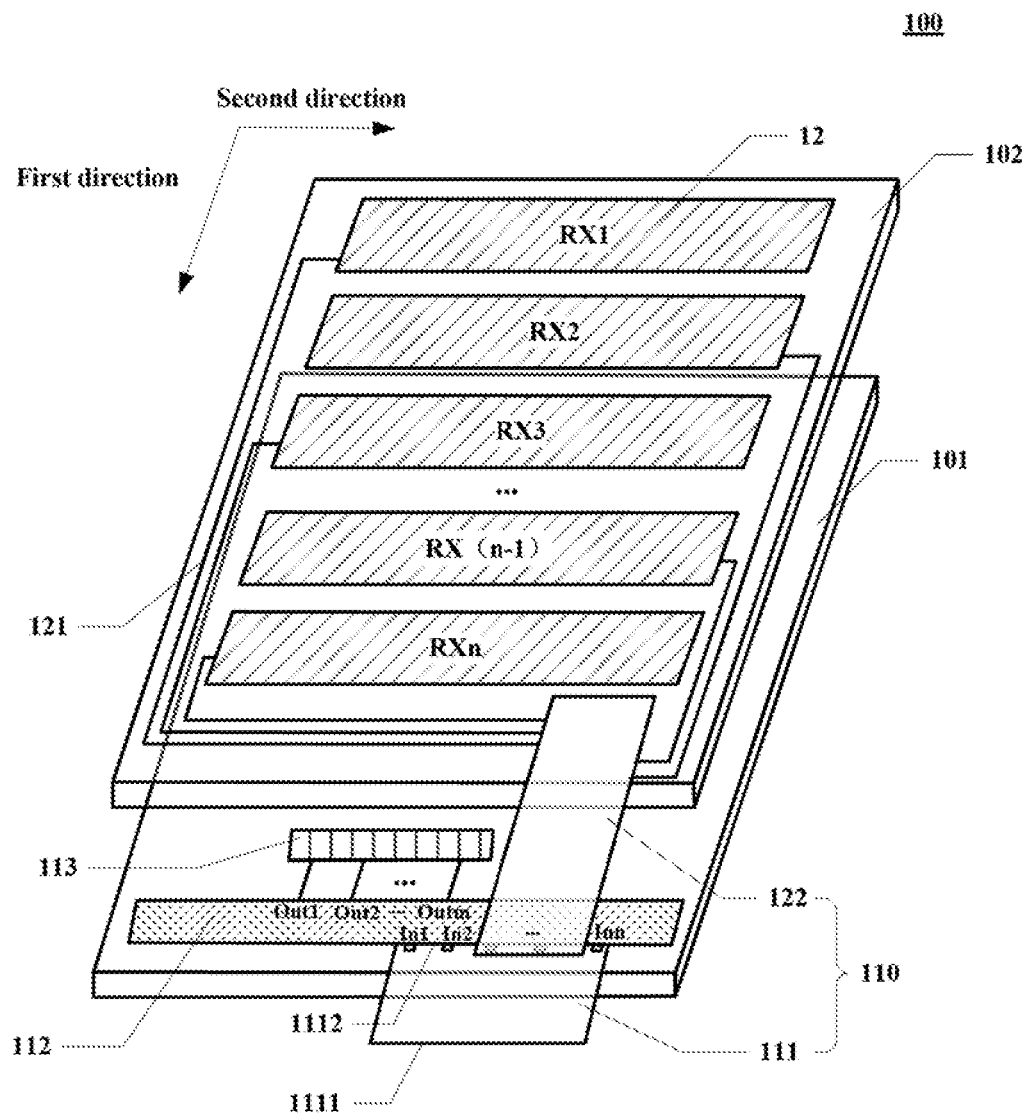
FIG. 1 illustrates a schematic view of an exemplary touch control display panel according to the disclosed embodiments.

The present disclosure provides a touch control display panel. FIG. 1 illustrates a schematic view of an exemplary touch control display panel according to the present disclosure. As shown in FIG. 1, the touch control display panel 100 may include an array substrate 101 and a color film substrate 102 arranged opposite to the array substrate 101.

The color film substrate 102 may include a plurality of touch sensing electrodes 12, which may be called RX1, RX2, . . . , RX(n−1), RXn, where n is a total number of the touch sensing electrodes 12. The color film substrate 102 may further include n number of touch sensing signal lines 121 one-to-one corresponding to the touch sensing electrodes 12. Each touch sensing signal line 121 may be electrically connected to a corresponding touch sensing electrode 12.

The array substrate 101 may include a driving IC chip 113 and a signal conversion unit 112. The signal conversion unit 112 may include n number of input terminals, i.e., In1, In2, . . . , Inn, and in number of output terminals, i,e., Out1, Out2, . . . , Outm, where m and n are positive integers, and m<n. The signal conversion unit 112 may convert signals received from the n number of input terminals, i.e., In, In2, . . . , Inn, to signals sent to the m number of output terminals, i.e., Ou1, Out2, . . . , Outm, respectively.

The signals received from n number of touch sensing electrodes RX1, RX2, . . . , RX(n−1), RXn may be converted by the signal conversion unit 112 to m number of signals to be sent to the driving IC chip 113. That is, the signal conversion unit 112 may configure n number of input signals from the input terminals to m number of output signals, and the driving IC chip 113 may derive the n number of input signals from the m number of output signals.

Thus, the driving IC chip 113 may be able to receive the touch sensing signals received from n number of touch sensing electrodes 12 through m number of interface terminals, such that the number of the interface terminals for the touch control function may be reduced, the cost of the touch control display panel may be lowered, and the undesired touch control misbehaviors due to the faulty bonding of the touch control chip may be avoided.

In certain embodiments, as shown in FIG. 1, the signal conversion unit 12 disposed on the array substrate 101 may be electrically connected to the touch sensing signal lines 12 disposed on the color film substrate 102 through a flexible circuit board 110. That is, the touch control display panel 100 may further include the flexible circuit board 110. Each touch sensing signal line 121 may be electrically connected to a corresponding input terminal (e.g., In1, In2, . . . , Inn) of the signal conversion unit 112 through the flexible circuit board 110.

Further, the flexible circuit board 110 may include a touch control flexible circuit board 122 and a primary flexible circuit board 111. The touch sensing signal lines 121 maybe electrically connected to the primary flexible circuit board 111 through the touch control flexible circuit board 122. The primary flexible circuit board 111 may be electrically connected to n number of input terminals (i.e., In1 In2, . . . , Inn) of the signal conversion unit 112 and an external driving module (not shown in FIG. 1). The primary flexible circuit board 111 may be bonded with the signal conversion unit 112 to transmit the output signals from the signal conversion unit 112 to the driving IC chip 113. At the same time, the driving IC chip 113 may receive input signals from the external driving module. The driving IC chip 113 may process the input signals to generate the corresponding display driving signals sent to the touch control display panel 100.

Further, the primary flexible circuit board 111 may include a bonding terminal 1111 and a signal input terminal 1112. The bonding terminal 1111 may be electrically connected to n number of input terminals through, for example, a conductive paste. The signal input terminal 1112 may be electrically connected to the external driving module. The signal conversion unit 112 may be disposed between the bonding terminal 1111 and the driving IC chip 113.

In certain other embodiments, the signal conversion unit 112 disposed on the array substrate 101 may be electrically connected to the touch sensing signal lines 121 disposed on the color film substrate 102 through conductive gold balls. In other words, through the conductive gold balls, the touch sensing signals returned from the touch sensing electrodes 12 may be transmitted to n number of input terminals of the signal conversion unit 112 disposed on the array substrate 101, where the touch sensing signals may be converted by the signal conversion unit 112, then transmitted to the driving IC chip 113 through m number of the output terminals. The driving IC chip 113 may determine a touch point or a touch position based on the touch sensing signals.

In the disclosed embodiments, the signal conversion unit 112 may combine n number of independent input signals into m number of output signals, which may be later transmitted to the driving IC chip 113 for processing. To ensure that the driving IC chip 113 is able to determine the the n number of input signals of the signal conversion unit 112 (i.e., the touch sensing signals returned from n number of touch sensing electrodes 12) based on the m number of received signals, the signal conversion unit 112 may have a circuit structure which combines gate signals and transistor groups, such that a same output terminal may receive signals from different input terminals in a time-division multiplexing manner.

For example, the signal conversion unit 112 may include in number of transistor groups and a plurality of gate signal lines. Each transistor group in the m number of transistor groups may correspond to one of the m number of output terminals. Various embodiments of circuit structures for the signal conversion unit 112 in the touch control display panel 100 disclosed by the present disclosure will be described in detail with reference to FIGS. 2-5.

Figure 2:
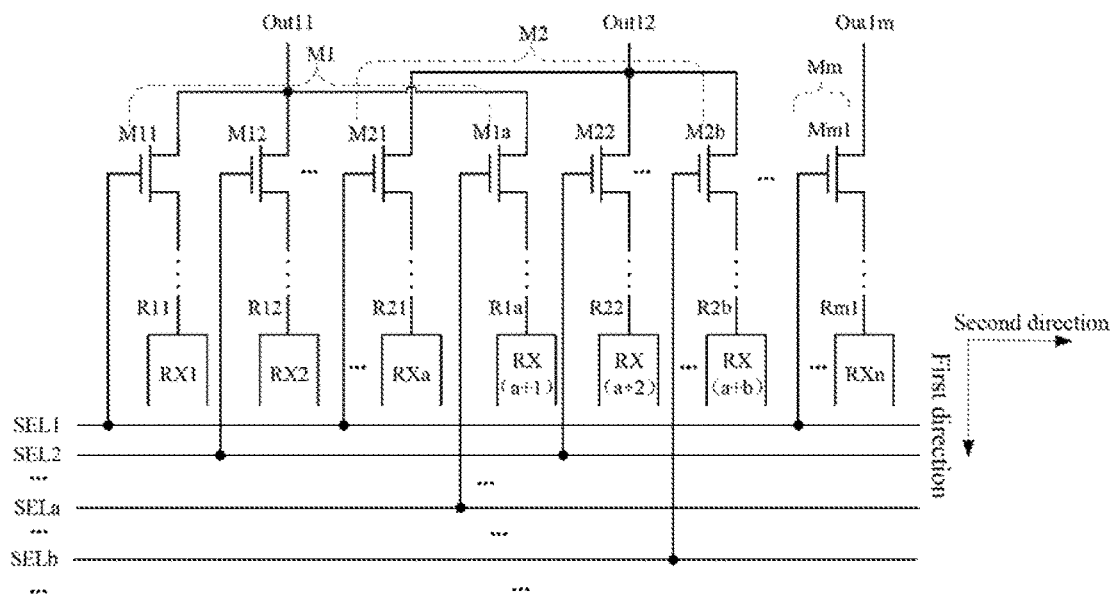
FIG. 2 illustrates a circuit diagram of an exemplary signal conversion unit of an exemplary touch control display panel according to the disclosed embodiments.

FIG. 2 illustrates a circuit diagram of an exemplary signal conversion unit of an exemplary touch control display panel according to the present disclosure. As shown in FIG. 2, the signal conversion unit 200 may include m number of transistor groups (i.e., M1, M2, . . . , Mm) and a plurality of gate signal lines (i.e., SEL1, SEL2, . . . , SELa, . . . , SELb, . . . , where m, a, and h are positive integers, and a<b.

Each of the transistor groups M1, M2, . . . , Mm may include at least one transistor. At least one of the m number of transistor groups M1, M2, . . . , Mm may include two or more transistors. For example, a transistor group M1 may include a number of transistors M11, M12, . . . , M1a, a transistor group M2 may include b number of transistors M21, M22, . . . , M2b, and a transistor group Mm may include one transistor Mm1.

In each of the transistor groups M, M2, . . . , Mm, the gate electrode of the transistor may be electrically connected to a gate signal line, the first electrode of the transistor may be electrically connected to the touch sensing signal line, and the second electrode of the transistor may be electrically connected to an output terminal. The second electrodes of transistors in different transistor groups may be electrically connected to different output terminals.

For example, in the first transistor group M1, the gate electrodes of the transistors M11, M12, . . . , M1a may be electrically connected to the gate signal lines SEL1, SEL2, . . . , SELa, respectively. The first electrodes of the transistors M11, M12, . . . , M1a may be electrically connected to the touch sensing signal lines R11, R12, . . . , R1a respectively, and the second electrodes of the transistors M11, M12, . . . , M1a may be electrically connected to an output terminal Out11.

In the second transistor group M2, the gate electrodes of the transistors M21, M22, . . . , M2b may be electrically connected to the gate signal lines SEL1, SEL2, . . . , SELb respectively. The first electrodes of the transistors M21, M22, . . . , M2b may be electrically connected to the touch sensing signal lines R21, R22, R2b respectively, and the second electrodes of the transistors M21, M22, . . . , M2b may be electrically connected to an output terminal Out12, In the m-th transistor group Mm, the gate electrode of the transistor Mm may be electrically connected to the gate signal line SEL1, the first electrode of the transistor Mm may be electrically connected to the touch sensing signal line Rn, and the second electrode of the transistor Mm may be electrically connected to an output terminal Out1m.

In each transistor group of the signal conversion unit 200, the first electrode of the transistor may be electrically connected to the touch sensing signal line 121 respectively through a flexible circuit board or a conductive gold ball. In particular, the first electrode of the transistor may be electrically connected to an input terminal of the signal conversion unit 112. The input terminal of the signal conversion unit 112 may be electrically connected to a corresponding touch sensing signal line 121 through a flexible circuit board or a conductive gold ball. Thus, the first electrode of the transistor may be electrically connected to the corresponding touch sensing signal line 121.

Further, the touch sensing signal lines 121 R11, R12, R1a, R21, R22, . . . , R2b, . . . , Rm1 may be electrically connected to the touch sensing electrodes RX1, RX2, . . . , RX(a+1), RXa, RX(a+2), . . . , RX(a+b), . . . , RXn, respectively. The transistor group M1 may transmit the touch sensing signals of the touch sensing electrodes RX1, RX2, . . . , RX(a−1), RX(a+1) to the first output terminal Out11. The transistor group M2 may transmit the touch sensing signals of the touch sensing electrodes RXa, RX(a+2), . . . , RX(a+b) to the second output terminal Out12. The transistor group Mm may transmit the touch sensing signal of the touch sensing electrode RXn to the m-th output terminal Out1m.

As shown in FIG. 2, at least one transistor group in the signal conversion unit 200 may combine the touch sensing signals from a plurality of the touch sensing electrodes 12 into the same output terminal for outputting. The first electrodes of the transistors in the transistor group may be electrically connected to different input terminals, respectively. The transistors may be controlled by different gate signals lines, respectively. The gate signal lines may turn on different transistors in the transistor group in the time-division multiplexing manner. The second electrodes of the transistors in the transistor group may be electrically connected to the same output terminal. Thus, through a plurality of transistors, one output terminal may be able to receive input signals from a plurality of input terminals in the time-division multiplexing manner.

In one embodiment, the transistor groups M1, M2, . . . , Mm may include a same number of transistors in each group. In another embodiment, the transistor groups M1, M2, . . . , Mm may include different number, of transistors in each group. The touch sensing electrode 12 may be a striped electrode. The touch sensing electrodes 12 may be arranged in a direction perpendicular to the extending direction of the touch sensing electrodes 12. The touch sensing electrodes 12 connected to other transistor groups may be disposed between the touch sensing electrodes 12 connected to the same transistor group. That is, the touch sensing electrodes 12 connected to the same transistor group may be not arranged consecutively in the direction perpendicular to the extending direction.

For example, as shown in FIG. 2, the touch sensing electrodes 12 may extend in a first direction, and may be arranged in a second direction. The first direction is perpendicular to the second direction. The touch sensing electrode RXa connected to the transistor M21 in the second transistor group M2 may be disposed between the touch sensing electrode RX(a+1) connected to the transistor M21 in the second transistor group M2 and the touch sensing electrodes RX1, RX2, etc., which are respectively connected to the transistors M1, M2, etc. in the first transistor group M1.

Figure 3:
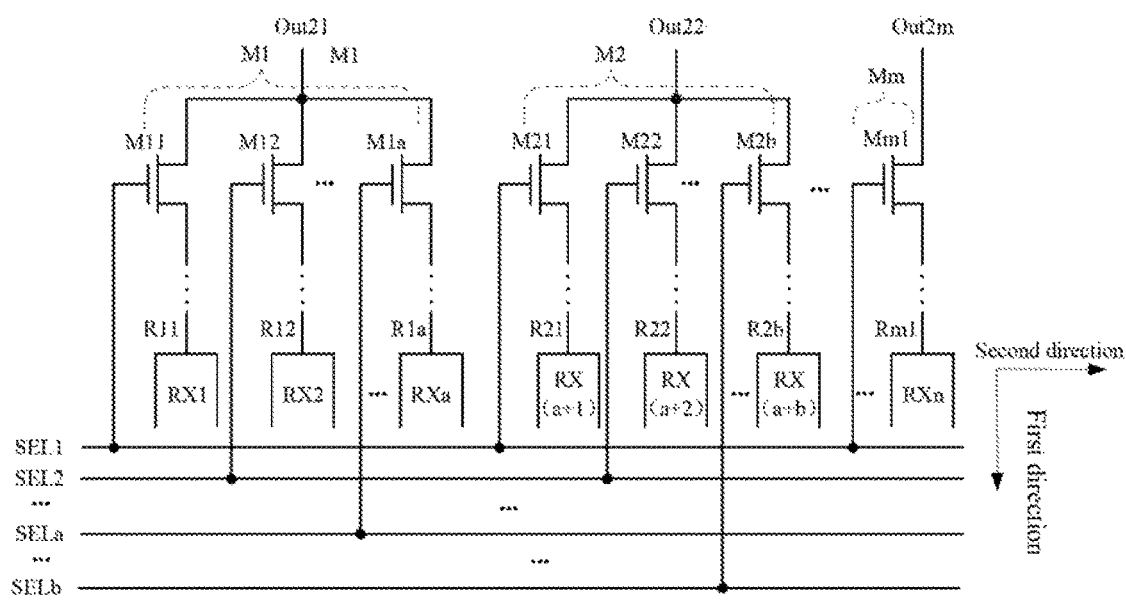
FIG. 3 illustrates a circuit diagram of another exemplary signal conversion unit of an exemplary touch control display panel according to the disclosed embodiments.

In another embodiment, a plurality of touch sensing electrodes connected to the same transistor group may be arranged consecutively in the direction perpendicular to the extending direction. FIG. 3 illustrates a circuit diagram of another exemplary signal conversion unit of an exemplary touch control display panel according to the present disclosure. The similarities between FIG. 2 and FIG. 3 are not repeated here, while certain differences may be explained.

As shown in FIG. 3, the signal conversion unit 300 may include m number of transistor groups M1, M2, . . . , Mm and a plurality of gate signal lines SEL1, SEL2, . . . , SELa, . . . , SELb, . . . , where m, a, and b are positive integers, and a<b.

Each of the transistor groups M1, M2, . . . , Mm may include at least one transistor. At least one of the transistor groups M1, M2, . . . , Mm may include two or more transistors. For example, a transistor group M1 may include a number of transistors M11, M12, . . . , M1a, a transistor group M2 may include b number of transistors M21, M22, . . . , M2b, and a transistor group Mm may include one transistor Mm1.

In each of the transistor groups M, M2, . . . , Mm, the gate electrode of the transistor may be electrically connected to a gate signal line, the first electrode of the transistor may be electrically connected to a touch sensing signal line, and the second electrode of the transistor may be electrically connected to an output terminal. For example, the second electrodes of the transistors in the first transistor group M1 may be electrically connected to an output terminal Out21. The second electrodes of the transistors in the second transistor group M2 may be electrically connected to an output terminal Out22. The second electrodes of the transistors in the m-th transistor group Mm may be electrically connected to an output terminal Out2m.

In one embodiment, the touch sensing electrodes RX1, RX2, ..., RXa, RX(a+1), RX(a+2), ..., RX(a+b), ..., RXn may be striped electrodes. For example, the touch sensing electrodes may be solid electrodes having a stripe shaped contour or metal mesh electrodes having a stripe-shaped contour. As shown in FIG. 3, the touch sensing electrodes may extend in a first direction, and may be arranged in a second direction. The first direction is perpendicular to the second direction. The shape of the touch sensing electrodes is for illustrative purposes and is not intended to limit the scope of the present disclosure.

Different from the signal conversion unit 200 shown in FIG. 2, in the signal conversion unit 300 shown in FIG. 3, the plurality of the touch sensing electrodes connected to each transistor group may be arranged consecutively in a direction perpendicular to the extending direction. For example, as shown in FIG. 3, the transistors M11, M12, ..., M1a in the first transistor group M1 may be electrically connected to the first through the a-th touch sensing electrodes RX1, RX2, ..., RXa, which are arranged in the second direction. The transistors M21, M22, ..., M2b in the second transistor group M2 may be electrically connected to the (a+1)-th through the (a+b)-th touch sensing electrodes RX(a+1), RX(a+2), ..., RX(a+b), which are arranged in the second direction. The transistor Mm1 in the m-th transistor group Mm may be electrically connected to the n-th touch sensing electrode RXn, which is arranged in the second direction.

In the existing touch detection method, the touch sensing electrodes may sequentially return the touch sensing signals. That is, the delay between the touch sensing signals returned by adjacent touch sensing electrodes may be less than the delay between the touch sensing signals returned by non-adjacent touch sensing electrodes. The larger the number of touch sensing electrodes between the two touch sensing electrodes, the greater the delay between the two returned touch sensing signals. One output terminal of the signal conversion unit may sequentially output the touch sensing signals returned from the connected touch sensing electrodes.

Thus, compared with the signal conversion unit 200 in FIG. 2, the signal conversion unit 300 in FIG. 3 may output consecutive touch sensing signals to the output terminals. When the driving IC chip processes the signals from the signal conversion unit 300, the driving IC chip may determine the touch sensing signal of the corresponding touch sensing electrode based on the order in which the gate signal line selects the transistors. Thus, the decomposition algorithm the driving IC chip applies to the received signals may be simplified, and the processing efficiency the driving IC chip may be improved.

Figure 4:
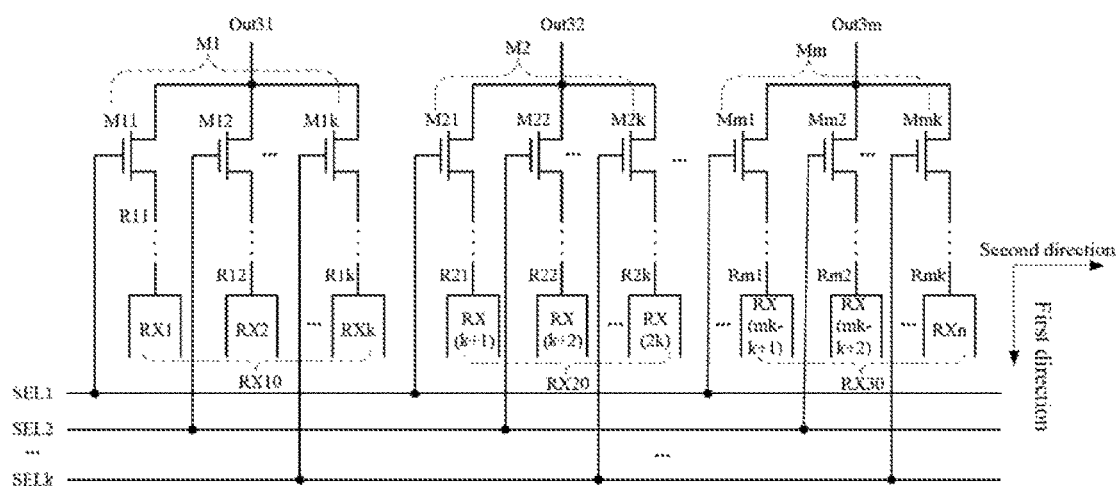
FIG. 4 illustrates a circuit diagram of another exemplary signal conversion unit of an exemplary touch control display panel according to the disclosed embodiments.

In certain embodiments, the transistor groups in the signal conversion unit may include an equal number of transistors in each transistor group, and the number of the gate signal lines may be equal to the number of the transistors in the transistor groups. FIG. 4 illustrates a circuit diagram of another exemplary signal conversion unit of an exemplary touch control display panel according to the present disclosure. The, similarities between FIG. 2 and FIG. 4 are not repeated here, while certain differences may be explained.

As shown in FIG. 4, the signal conversion unit 400 may include m number of transistor groups M1, M2, ..., Mm. Each transistor group may include k number of transistors. For example, the first transistor group M1 may include the k number of transistors M11, M12, ..., M1k, the second transistor group M2 may include the k number of transistors M21, M22, ..., M2k, and the m-th transistor group Mm may include the k number of transistors Mm1, Mm2, ..., Mmk. The signal conversion unit 400 may further include k number of gate signal lines SEL1, SEL2, ..., SELk, which may be electrically connected to the driving IC chip. In a transistor group, each transistor may be electrically connected to a gate signal line. n denotes the number of the input terminals of the signal conversion unit 400. m denotes the number of output terminals of the signal conversion unit 400. k is a positive integer, and m*k=n.

A plurality of touch sensing signal lines electrically connected to each of the transistor groups M1, M2, ..., Mm may correspond to one of the touch electrode groups RX10, RX20, ..., RX30. Each touch sensing electrode group may include a plurality of touch sensing electrodes. For example, the touch sensing electrode group RX10 may include k number of touch sensing electrodes RX1, RX2, ..., RXk. The touch sensing electrode group RX20 may include k number of touch sensing electrodes RX(k+1), RX(k+2), ..., RX(2k). The touch sensing electrode group RX30 may include k number of touch sensing electrodes RX(mk−k+1), RX(mk−k+2), ..., RXn.

Each touch sensing electrode may have a striped shape, and may extend in a first direction. The touch sensing electrodes in each of the touch sensing electrode groups RX10, RX20, and RX30 may be arranged consecutively in a direction (e.g., a second direction) perpendicular to the extending direction of the touch sensing electrodes.

As shown in FIG. 4, compared to the signal conversion unit 300 in FIG. 3, the signal conversion unit 400 may have an equal number of transistors in each transistor group. Thus, the number of the gate signal lines may be reduced. Because the signals on the gate signal lines are often supplied by the driving IC chip, the signal conversion unit 400 may further reduce the number of interfaces of the driving IC chip intended for the touch control function and the load on the driving IC chip.

Figure 5:
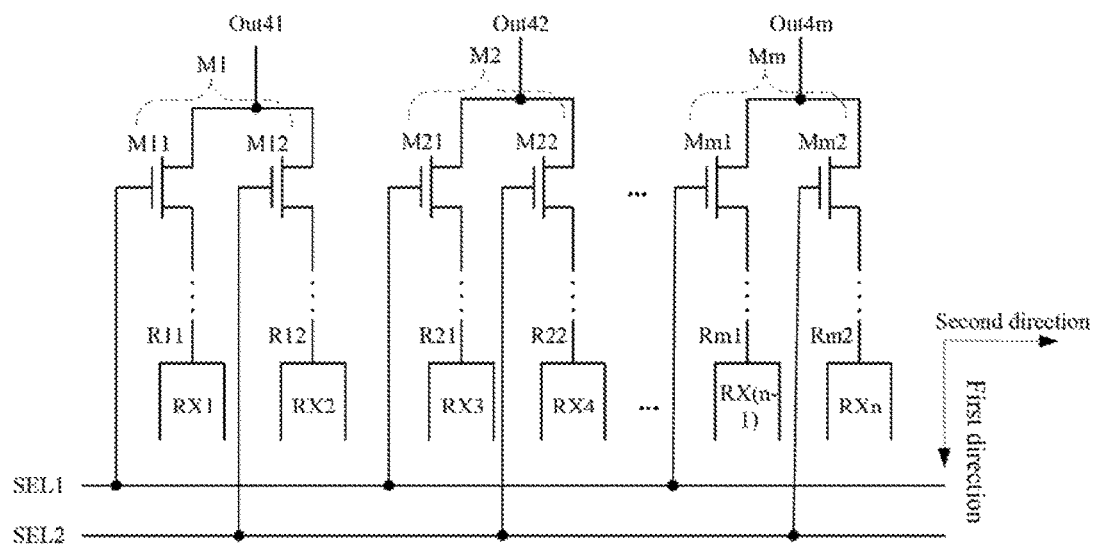
FIG. 5 illustrates a circuit diagram of another exemplary signal conversion unit of an exemplary touch control display panel according to the disclosed embodiments.

To further reduce the number of the gate signal lines, the touch control display panel disclosed by the present disclosure may include a signal conversion unit 500 having a circuit structure as shown in FIG. 5. FIG. 5 illustrates a circuit diagram of another exemplary signal conversion unit of an exemplary touch control display panel according to the present disclosure. The similarities between FIG. 2 and FIG. 5 are not repeated here, while certain differences may be explained.

As shown in FIG. 5, the signal conversion unit 500 may include m number of transistor groups. Each transistor group may include two transistors. For example, the transistor group M1 may include, transistors M11 and M12. The transistor group M2 may include transistors M21 and M22. The transistor group Mm may include transistors Mm1 and Mm2.

The signal conversion unit 500 may further include two gate signal lines SEL1 and SEL2. The gate electrodes of the two transistors in each transistor group may be electrically connected to the two gate signal lines, respectively. The first electrodes of the two transistors in each transistor group may be electrically connected to the two touch sensing signal lines, respectively. That is, the first electrode of each transistor in each transistor group may be electrically connected to one touch sensing electrode.

For example, the first electrodes of the transistors M11 and M12 in the transistor group M1 may be electrically connected to the touch sensing electrodes RX1 and RX2 through the touch sensing signal lines R11 and R12, respectively. The first electrodes of the transistors M21 and M22 in the transistor group M2 may be electrically connected to the touch sensing electrodes RX3 and RX4 through the touch sensing signal lines R21 and R22, respectively. The first electrodes of the transistors Mm1 and Mm2 in the transistor group Mm may be electrically connected to the touch sensing electrodes RX(n-1) and RXn through the touch sensing signal lines Rm1 and Rm2, respectively.

In one embodiment, the number of the transistor groups (i.e., m) and the of the touch sensing electrodes (i.e., n) may satisfy the relationship equation: n=2*m, i.e., the number of the transistor groups is one-half of the number of the touch sensing electrodes. The number of the gate signal lines may be two. The two gate signal lines may turn on the two transistors in each transistor group. Each transistor group may be electrically connected to the two touch sensing electrodes arranged consecutively in the first direction. Thus, the signal conversion unit 500 may sequentially output the touch sensing signals returned from the two touch sensing electrodes via each output terminal.

By introducing the signal conversion units as shown in FIGS. 2-5 into the touch control display panel, the number of the interfaces on the driving IC chip intended for the touch sensing electrodes to return the touch sensing signals may be reduced, the cost of the touch control display panel may be lowered, and the undesired touch misbehaviors due to faulty binding of the touch chip may be avoided.

Figure 6:
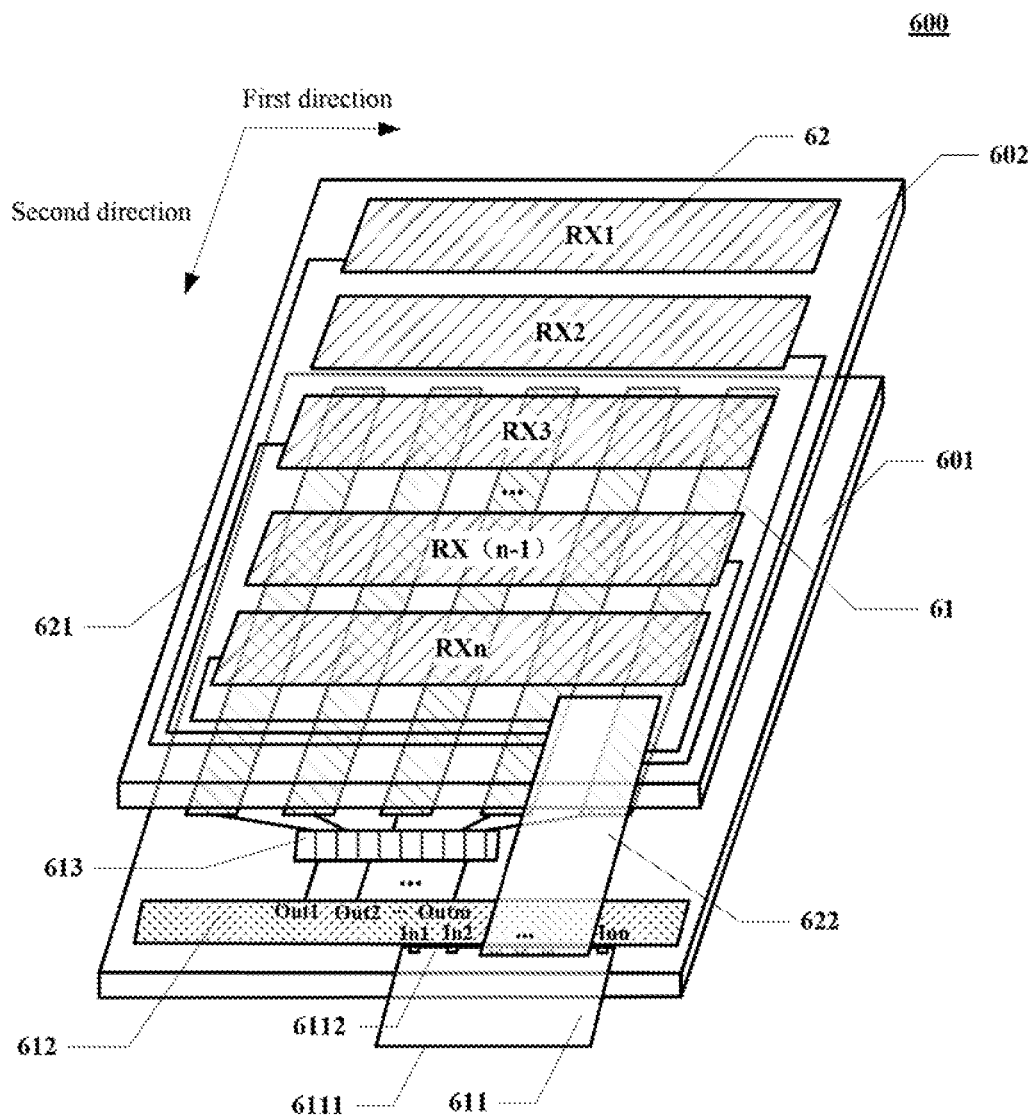
FIG. 6 illustrates a schematic view of another exemplary touch control display panel according lo the disclosed embodiments.

FIG. 6 illustrates a schematic view of another exemplary touch control display panel according to the present disclosure. The similarities between FIG. 1 and FIG. 6 are not repeated here, while certain differences may be explained.

As shown in FIG. 6, the touch sensitive display panel 600 may include an array substrate 601 and a color film substrate 602 disposed facing toward the array substrate 601. The color film substrate 602 may include a plurality of touch sensing electrodes 62. The number of the touch sensing electrodes 62 may be n. The n number of touch sensing electrodes 62 may be RX1, RX2, . . . , RX(n-1), RXn. The color film substrate 602 may further include n number of touch sensing signal lines 621, which a may be electrically connected to the touch sensing electrodes 62, respectively.

The array substrate 601 may include a driving IC chip 613 and a signal conversion unit 612. The signal conversion unit 612 may include n number of input terminals In1, In2, . . . , Inn and m number of output terminals Out1, Out2, . . . , Outm, where m and n are positive integers, and m<n. The signal conversion unit 612 may combine signals from the n number of input terminals In1, In2, . . . , Inn into the m number of signals and then transmit the m number of signals to the output terminals Out1, Out2, . . . , Outm.

The signal conversion unit 612 disposed on the array substrate 601 may be connected to the touch sensing signal lines 621 disposed on the color film substrate 602 through a touch flexible circuit board 622 and a primary flexible circuit board 611. Specifically, the touch sensing signal lines 621 may be connected to the primary flexible circuit board 611 through the touch flexible circuit board 622. The primary flexible circuit board 611 may be electrically connected to the n number of input terminals In1, In2, . . . , Inn of the signal conversion unit 612 and an external driving module (not shown in FIG. 6).

The primary flexible circuit board 611 may be bonded with the signal conversion unit 612 to transmit the output signals of the signal conversion unit 612 to the driving IC chip 613. At the same time, the driving, IC chip 613 may receive signals from the external driving module, which may be processed to supply corresponding display driving signals to the touch control display panel. Further, the primary flexible circuit board 611 may include a bonding terminal 6111 and a signal input terminal 6112. The bonding terminal 6111 may be electrically connected to the n number of input terminals. The signal input terminal 6112 may be electrically connected to the external driving module through, for example, a conductive paste. The signal conversion unit 612 may be disposed between the bonding terminal 6111 and the driving IC chip 613.

In one embodiment, the touch sensing electrodes 62 may extend in a first direction on the color film substrate 602. The n number of touch sensing electrodes RX1, RX2, . . . , RXn may be arranged in a second direction. The array substrate 601 may further include a plurality of touch driving electrodes 61. The touch driving electrodes 61 may extend in the second direction and may be arranged in the first direction. The first direction may be perpendicular to the second direction.

Further, the touch sensing electrodes 62 and the touch driving electrodes 61 may have a stripe shape. Specifically, the touch driving electrodes 61 may be solid electrodes made of indium tin oxide (ITO) and have a striped shape. The touch sensing electrodes 62 may be solid electrodes or metal mesh electrodes, which are made of ITO and have a striped shape.

The touch driving electrode 61 may be connected to the driving IC chip 613. In a touch stage, the touch driving electrodes 61 may receive touch driving signals from the driving IC chip 613. In certain embodiments, the touch driving; electrodes 61 may be multiplexed as the common electrode. That is, in a display stage, the touch driving electrode 61 may function as the common electrode to receive the common electrode signal from the driving IC chip 613.

In one embodiment, to reduce the number of interfaces on the driving IC chip 613 intended for supplying signals to touch driving electrodes 61, a touch driving circuit may be disposed between the driving IC chip 613 and the touch driving electrodes 61. The input terminals of the touch driving circuit may be electrically connected to the driving IC chip 613. The output terminals of the touch driving circuit may be electrically connected to the touch driving electrodes 61. The touch driving circuit nay have fewer input terminals than output terminals. The touch driving circuit may sequentially supply the touch driving signals to the touch driving electrodes 61 based on the signals from the driving IC chip 613.

The present disclosure also provides a driving method for the disclosed touch control display panel. The driving method may include driving the touch control display panel in a display stage and a touch stage. In particular, the driving method may include: in the display stage, disconnecting the touch sensing signal lines from the output terminals of the signal conversion unit; and in the touch stage, sequentially connecting the touch sensing signal lines with the corresponding output terminals of the signal conversion unit, and receiving the n number of signals returned from the touch sensing electrodes via the in number of the output terminals.

That is, in the display stage, the driving IC chip may not receive signals returned from the touch sensing electrodes, in which the driving IC chip may be disconnected from the touch sensing electrodes by disconnecting the touch sensing signal lines from the output terminals of the signal conversion unit. In the touch stage, the signals returned from the touch sensing electrodes may be sent to the driving IC chip through turning on the electrical connection between the touch sensing signal lines and the output terminals of the signal conversion unit.

Further, the touch control display panel may comprise any one of the disclosed signal conversion unit shown in FIGS. 2-5. The signal conversion unit may comprise m number of transistor groups and a plurality of gate signal lines. Each transistor group may include at least one transistor. At least one of the m number of transistor groups may include two or more transistors. In each transistor group, the gate electrode of transistor may be electrically connected to the corresponding gate signal line, the first electrode of transistor may be electrically connected to the corresponding touch sensing signal line, and the second electrode of transistor may be electrically connected to the corresponding output terminal of the signal conversion unit. The second electrodes of the transistors belonging to different transistor groups may be electrically connected to different output terminals of the signal conversion unit.

Then the driving method may further include controlling the electrical connection between the output terminal of the signal conversion unit and the corresponding touch sensing signal line through the gate signal line. In particular, the driving method may further include supplying a ground voltage signal to the gate signal lines in the display stage, and receiving the touch sensing signals returned from the touch sensing electrodes by the signal conversion unit in the touch stage. In this case, first pulse signals may be sequentially supplied to the gate signal lines. The first pulse signals may have a first cycle period.

in the disclosed driving method, a ground signal may be supplied to the gate signal lines in the display stage to turn off the transistor groups. That is, the touch sensing signal lines may be electrically disconnected from the output terminals of the signal conversion unit, providing static discharge protection. In the touch stage, the first pulse signals may be sequentially supplied to the gate signal lines to turn on the transistors in transistor groups. Thus, during the time periods the transistors are turned on, the touch sensing signal lines electrically connected to the transistors may transmit the touch sensing signals returned from the touch sensing electrodes to the corresponding output terminals of the signal conversion unit, respectively.

Further, each gate signal line may be electrically connected to a plurality of transistors, which may belong to different transistor groups. The second electrodes of the transistors may be electrically connected to different output terminals. Thus, when one gate signal line sends out the first pulse signal, the output terminals corresponding to the plurality of transistors electrically connected to the gate signal line may output touch sensing signals.

In certain embodiments, the disclosed driving method may further include determining a touch point based on the signals outputted by the output terminals of the signal conversion unit in the touch stage. The signals at the output terminals of the signal conversion unit may include the touch sensing signals returned from one or more touch sensing electrodes. The driving IC chip may determine the location of the touch point based on the touch sensing signals returned from the touch sensing electrodes.

In one embodiment, when the touch control display panel also includes the touch driving electrodes 61 as shown in FIG. 6, before determining the location of the touch point based on the signals at the output terminals of the signal conversion unit, the driving method may further include sequentially supplying touch scanning signals to the touch driving electrodes in the touch stage. When supplying the touch scanning signals to the touch driving electrodes, because the touch driving electrodes and the touch sensing electrodes intersect and form mutual capacitance at the intersections, the touch sensing electrodes may generate the touch sensing signals.

When being touched by a finger or a stylus, the touch sensing signals generated by the touch sensing electrodes may change as compared to the touch sensing signals without a touch presence. By analyzing the signals at each output terminal of the signal conversion unit, the driving IC chip may obtain the signal returned from each corresponding touch sensing electrode. Based on the change of the signal returned from each corresponding touch sensing electrode due to a partial discharge caused by the finger touch, the location of the touch point may be determined.

In another embodiment, the driving IC chip may directly analyze the signals at the output terminals of the signal conversion unit to determine the location of the touch sensing electrode affected by a finger touch. When the finger touches the touch control display panel, the touch sensing signal returned from the affected touch sensing electrode may be attenuated due to the partial discharge.

The operation principle of the touch control display panel disclosed by the present disclosure will be further described in detail with reference to FIG. 7 and FIG. 8. For illustration purpose, the touch control display panel may include the signal conversion unit as shown in FIG. 2 or the signal conversion unit as shown in FIG. 5.

Figure 7:
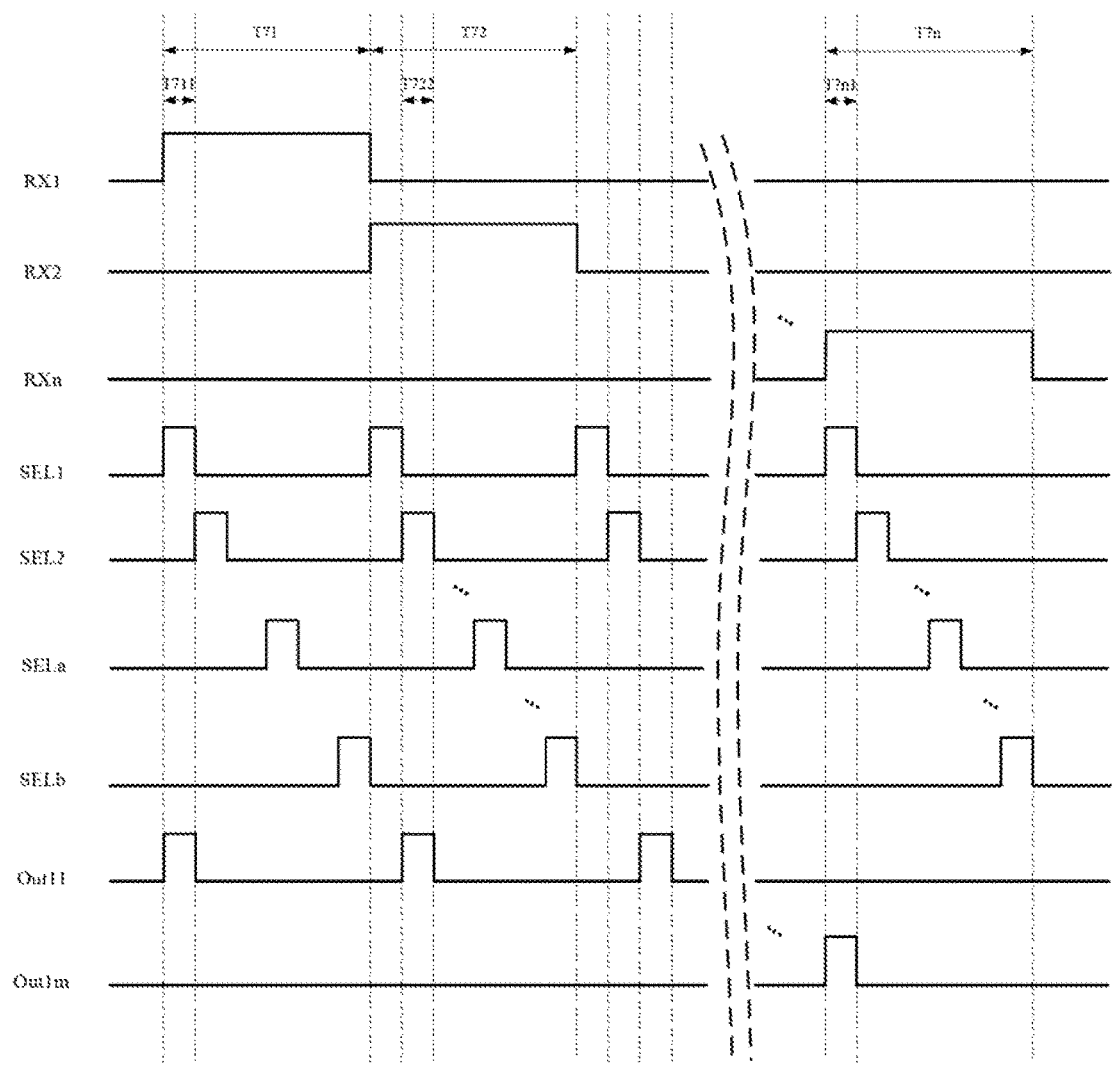
FIG. 7 illustrates an exemplary touch stage timing diagram of an exemplary touch control display panel including the signal conversion unit in FIG. 2.

FIG. 7 illustrates an exemplary touch stage timing diagram of an exemplary touch control display panel including the signal conversion unit as shown in FIG. 2. In the timing diagram, the maximum number of transistors in the transistor groups as shown in FIG. 2 is b. As shown in FIG. 2, RX1, RX2, . . . , RXn denote the touch sensing signals returned from the touch sensing electrodes RX 1, RX2, . . . , RXn, respectively, in the touch stage. SEL1, SEL2, . . . , SELa, . . . , SELb denote the signals supplied to the gate signal lines SEL1, SEL2, . . . , SELa, . . . , SELb, respectively, and Out11, and Out1m denote the signals at the output terminals Out11 and Out1m, respectively.

As shown in FIG. 7, in the touch stage, the touch sensing electrodes RX1, RX2, . . . , RXn may return the touch sensing signals sequentially, which are called second pulse signals. The touch sensing signal or the second pulse signal may have a second cycle period. FIG. 7 shows only one cycle of the touch sensing signals. In actual application scenarios, the second pulse signal with a plurality of cycles may be returned from the touch sensing electrodes within the duration of one touch detection.

In the time period T71, the touch sensing signal returned from the first touch sensing electrode RX1 may be a first level signal (e.g., a high level signal). The gate signal lines SEL1, SEL2, . . . , SELa, . . . , SELb may send turn-on signals successively to turn on the transistors M11, M12, . . . , M1a in the transistor group M1 one by one. In the time period T711, the transistor M11 may be turned on while other transistors M12, . . . , M1a in the transistor group M1 may be turned off. The first output terminal Out11 may receive the first level signal returned from the first touch sensing electrode RX1 through the touch sensing signal line R11 which is electrically connected to the first electrode of the transistor M11. The other output terminals Out12, . . . , Out1m may receive second level signals (e.g., low level signals) returned from the other touch sensing; electrodes RX2, . . . , RXn.

In the time period T72, the touch sensing signal returned from the second touch sensing electrode RX2 may be a first level signal. The gate signal lines SEL1, SEL2, . . . , SELa, . . . , SELb may send the turn-on signals successively to turn on the transistors M11, M12, . . . , M1a in the transistor group M1 one by one. In the time period T722, the transistor M12 may be turned on while other transistors M11, M13, . . . , M1a in the transistor group M1 may be turned off. The first output terminal Out11 may receive the first level signal returned from the second touch sensing electrode RX2 through the touch sensing signal line R12 which is electrically connected to the first electrode of the transistor M12. The other output terminals Out12, . . . , Out1m may receive the second level signals returned from the other touch sensing electrodes RX1, RX3, . . . , RXn.

Similarly, in a time period (not shown in FIG. 7) in which the touch sensing signal returned from the a-th touch sensing electrode RXa is a first level signal, the gate signal lines SEL1, SEL2, . . . , SELa, . . . , SELb may send the turn-on signals successively to turn on the transistors M21, M22, . . . , M2b in the transistor group M2 one by one. In particular, when the transistor M21 is turned on, the other transistors M22, . . . , M2b in the transistor group M2 may be turned off, and the second output terminal Out12 may receive the first level signal returned from the touch sensing electrode RXa through the touch sensing signal line R21 which is electrically connected to the first electrode of the transistor M21. Meanwhile, the other output terminals Out11, OUT13, . . . , Out1m may receive the second level signals returned from the other touch sensing electrodes RX1, RX2, . . . , RX(a−1), RX(a+1), . . . , RXn.

Further, in the time period T7n, the touch sensing signal returned from the nth touch sensing electrode RXn as shown in FIG. 2 may be a first level signal. The gate signal line SEL1, SEL2, . . . , SELa, . . . , SELb may send the turn-on signal successively to turn on the transistor Mm1 in the transistor group Mm. In the time period T7n1, the transistor Mm1 in the transistor group Mm may be turned on. The m-th output terminal Out1m may receive the first level signal returned from the touch sensing electrode RXn through the touch sensing signal line Rm1 which is electrically connected to the first electrode of the transistor Mm1. The other out terminals Out11, Out12, . . . , Out1(m−1) may receive the second level signals returned from the other touch sensing electrodes RX1, RX2, . . . , RX(n−1).

As shown in FIG. 7, the first cycle period of the first pulse signal, supplied to gate signal lines may be equal to one pulse width of the second pulse signal returned from the touch sensing electrodes, thereby ensuring that the signal conversion unit may receive the touch sensing signals returned from all the touch sensing electrodes, then transmit the touch sensing signals to the driving IC chip. Without analyzing and processing the signals, the signal conversion unit in the touch control display panel disclosed by the present disclosure may combine the touch sensing signals returned from a plurality of touch sensing electrodes into one signal, which is later sent to the driving IC chip through one output terminal. Thus, the number of the interfaces on the driving IC chip intended for the touch control function may be reduced.

Further, when the number of transistors in the transistor groups are the same (e.g., k number of transistors in each transistor group), and the k number of transistors are turned on one by one in one pulse width of the second pulse signals, the sum of the k number of the pulse widths of the first pulse signals may be equal to one pulse width of the second pulse signals. In this case, the first pulse signals may have a duty cycle of about 1/k, and the signals received at the output terminals may have a duty cycle of about 1/(k+1), where k is a positive integer, and 1<k≤n.

Figure 8:
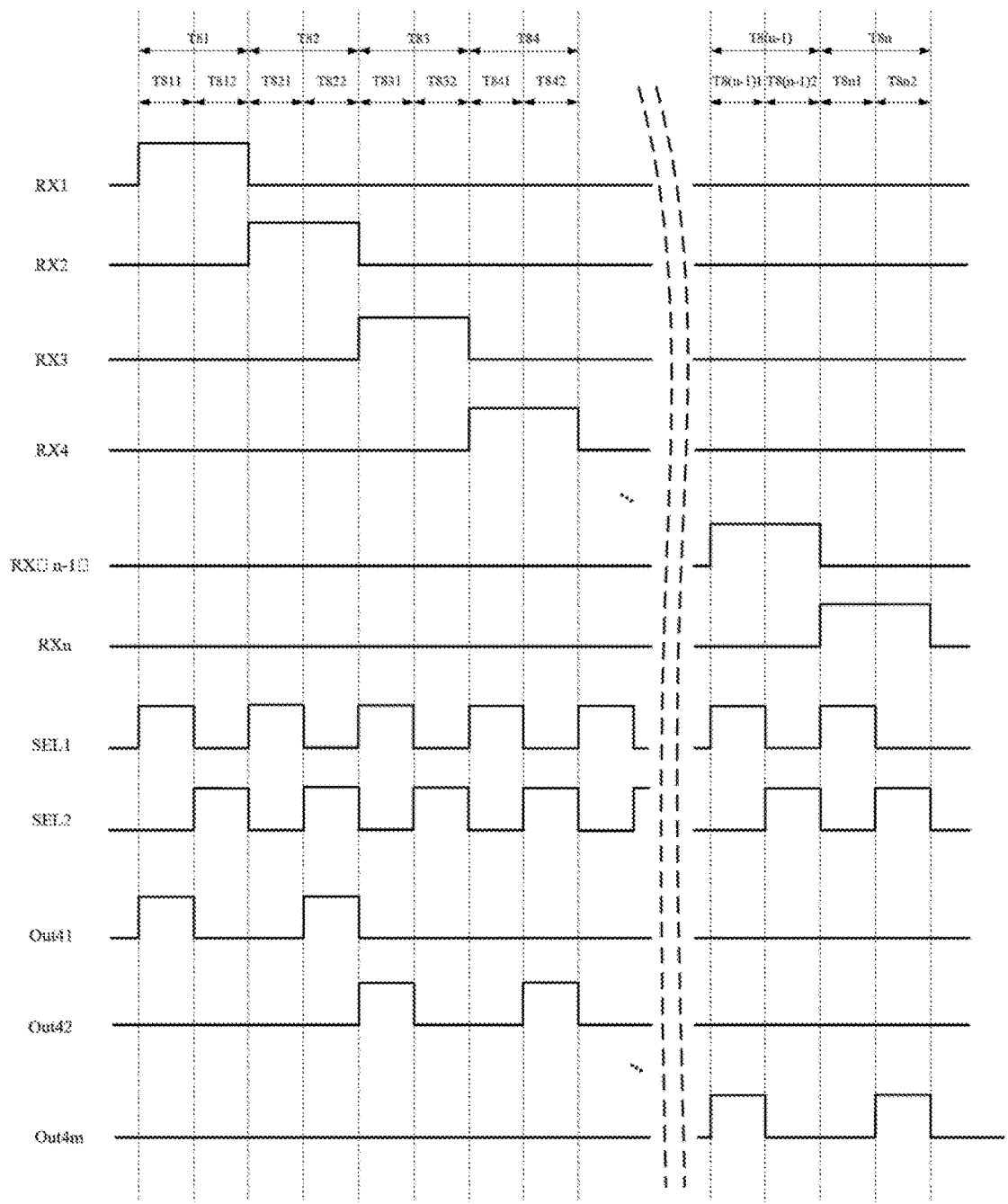
FIG. 8 illustrates an exemplary touch stage timing diagram of an exemplary touch control display panel including the signal conversion unit in FIG. 5.

FIG. 8 illustrates an exemplary touch stage timing diagram of an exemplary touch control display panel including the signal conversion unit as shown in FIG. 5. The similarities between FIG. 7 and FIG. 8 are not repeated here, while certain differences may be explained.

As shown in FIG. 5, RX1, RX2, . . . , RXn denote the touch sensing signals returned from the touch sensing electrodes RX1, RX2, . . . , RXn, respectively, SEL1, and SEL2 denote the signals supplied to the gate signal lines, respectively, and Out41, Out42, and Out4m denote the signals at the output terminals Out41, Out42, and Out4m, respectively. In one embodiment, n is an even number.

As shown in FIG. 8, in the touch stage, the n number of touch sensing electrodes RX1, RX2, RX3, RX4, . . . , RX(n−1), RXn may return the touch sensing signals in order, which are called second pulse signals. The touch sensing signals or the second pulse signals may have a second cycle period. FIG. 8 shows only one cycle of the touch sensing signals. In actual application scenarios, the second pulse signals with a plurality of cycles may be returned from the touch sensing electrodes within the duration of the touch detection. In this case, n is an even number, and n=2*m, where m is the number of output terminals of the signal conversion unit.

In the time period T81, the touch sensing signal returned from the first touch sensing electrode RX1 may be a first level signal (e.g., a high level signal). The gate signal lines SEL1 and SEL2 may send turn-on signals successively to turn on the transistors M11 and M12 in the transistor group M1 one by one. In the time period T811, the transistor M11 may be turned on while the other transistor M12 in the transistor group M1 may be turned off. The first output terminal Out41 may receive the first level signal returned from the first touch sensing electrode RX1 through the touch sensing signal line R11 which is electrically connected to the first electrode of the transistor M11. The other output terminals Out42, . . . , Out4m may receive second level signals (e.g., low level signals) returned from the other touch sensing electrodes RX2, . . . , RXn.

In the time period T812, the transistor M11 may be turned off while the other transistor M12 in the transistor group M1 may be turned on. The first output terminal Out41 may receive the second level signal returned from the second touch sensing electrode RX2 through the touch sensing signal line R12 which is electrically connected to the first electrode of the transistor M12. The other output terminals Out42, . . . , Out4m may receive second level signals returned from the other touch sensing electrodes RX1, RX3, . . . , RXn.

In the time period T82, the touch sensing signal returned from the second touch sensing electrode RX2 may be the first level signal. The gate signal lines SEL1 and SEL2 may send turn-on signals successively to turn on the transistors M11 and M12 in the transistor group M1 one by one. In the time period T822, the transistor M11 may be turned off while the other transistor M12 in the transistor group M1 may be turned on. The first output terminal Out41 may receive the first level signal returned from the second touch sensing electrode RX2 through the touch sensing signal line R12 which is electrically connected to the first electrode of the transistor M12. The other output terminals Out42, . . . , Out4m may receive the second level signals returned from the other touch sensing electrodes RX1, RX3, RX4, . . . , RX(n−1), RXn.

In the time period T821, the transistor M11 may be turned on while the other transistor M12 in the transistor group M1 may be turned off. The first output terminal Out41 may receive the second level signal returned from the first touch sensing electrode RX1 through the touch sensing signal line R11 which is electrically connected to the first electrode of the transistor M11. The other output terminals Out 42, . . . , Out4m may receive the second level signals returned from the other touch sensing electrodes RX2, RX3, . . . , RXn.

In the time period T83, the touch sensing signal returned from the third touch sensing electrode RX3 may be the first level signal. The gate signal lines SEL1 and SEL2 may send turn-on signals successively to turn on the transistors M21 and M22 in the transistor group M2 one by one. In the time period T831, the transistor M21 may be turned on while the other transistor M22 in the transistor group M2 may be turned off. The second output terminal Out42 may receive the first level signal returned from the third touch sensing electrode RX3 through the touch sensing signal line R21 which is electrically connected to the first electrode of the transistor M21. The other output terminals Out41, Out43, . . . , Out4m may receive the second level signals returned from the other touch sensing electrodes RX1, RX2, RX4, . . . , RXn.

In the time period T832, the transistor M22 may be turned on while the other transistor M21 in the transistor group M2 may be turned off. The second output terminal Out42 may receive the second level signal returned from the fourth touch sensing electrode RX4 through the touch sensing signal line R22 which is electrically connected to the first electrode of the transistor M22. The other output terminals Out41, Out43, . . . , Out4m may receive the second level signals returned from the other touch sensing electrodes RX1, RX2, RX3, RX5, . . . , RXn.

Similarly, in the time period T84, the touch sensing signal returned from the fourth touch sensing electrode RX4 may be the first level signal. When the transistors in the transistor groups, which are electrically connected to the gate signal line SEL2, are turned on (as in the time period T842 in FIG. 8), the second output terminal Out42 may receive the first level signal, and the other output terminals may receive the second level signals. When the transistors in the transistor groups, which are electrically connected to the gate signal line SEL1, are turned on (as in the time period T841 in FIG. 8), all the output terminals may receive the second level signals.

In the time period T8(n-1), the touch sensing signal returned from the (n-1)-th touch sensing electrode RX(n-1) may be the first level signal. When the transistors in the transistor groups, which are electrically connected to the gate signal line SEL1, are turned an (as in the time period T8(n-1)1 in FIG. 8), the m-th output terminal Out4m may receive the first level signal, and the other output terminals may receive the second level signals. When the transistors in the transistor groups, which are electrically connected to the gate signal line SEL2, are turned on (as in the, time period T8(n-1)2 in FIG. 8), all the output terminals may receive the second level signals.

In the time period T8n, the touch sensing signal returned from the nth touch sensing electrode RXn may be the first level signal. When the transistors in the transistor groups, which are electrically connected to the gate signal line SEL2, are turned on (as in the time period T8n2 in FIG. 8), the m-th output terminal Out4m may receive the first level and the other output terminals may receive the second level signals. When the transistors in the transistor groups, which are electrically connected to the gate signal line SEL1, are turned on (as in the time period T8n1 in FIG. 8), all the output terminals may receive the second level signals.

As shown in FIG. 8, the signal conversion unit may combine the touch sensing signals returned from two touch sensing electrodes into one signal, and then may transmit the signal to the driving IC chip through one output terminal. The signal conversion unit may reduce the number of interfaces on the driving IC chip for receiving the touch sensing signals. Thus, a touch IC chip may be eliminated, the cost of the touch control display panel may be lowered, and the undesired touch misbehaviors due to faulty bonding of the touch chip may be avoided.

Figure 9:
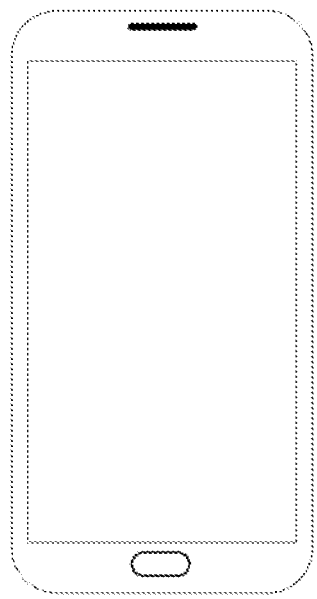
FIG. 9 illustrates a schematic view of an exemplary touch control display device according to the disclosed embodiments.

The present disclosure also provides a touch control display device. FIG. 9 illustrates a schematic view of an exemplary touch control display device according to the present disclosure. As shown in FIG. 9, the touch control display device 900 may include any one of the disclosed touch control display panels. The touch control display device 900 may include a smart phone, a tablet computer, a smart watch, a wearable display device, etc. The touch control display device 900 may also include a backlit light source, an optical guide plate, a liquid crystal layer disposed between the array substrate and the color film substrate, an alignment film, a protective glass, and other well-known display structures, which will not be described here.

Various embodiments have been described to illustrate the operation principles and exemplary implementations. It should be understood by those skilled in the art that the present invention is not limited to the specific embodiments described herein and that various other obvious changes, rearrangements, and substitutions will occur to those skilled in the art without departing from the scope of the invention. Thus, while the present invention has been described in detail with reference to the above described embodiments, the present invention is not limited to the above described embodiments, but may be embodied in other equivalent forms without departing from the scope of the present invention, which is determined by the appended claims.

What is claimed is:

1. A touch control display panel, comprising:
   a color film substrate including a plurality of touch sensing electrodes and a plurality of touch sensing signal lines electrically connected to the plurality of the touch sensing electrodes, respectively; and
   an array substrate arranged opposite to the color film substrate and including a driving IC chip and a signal conversion unit,
   wherein the signal conversion unit includes a plurality of input terminals and a plurality of output terminals,
   the plurality of input terminals are electrically connected to the plurality of the touch sensing signal lines, respectively,
   the plurality of output terminals are electrically connected to the driving IC chip,
   the signal conversion unit combines a plurality of input signals received at the plurality of the input terminals into a plurality of output signals, and transmits the plurality of output signals to the plurality of the output terminals, respectively,
   the signal conversion unit includes m number of transistor groups and a plurality of gate signal lines, each transistor group including at least one transistor, and
   in each transistor group, a gate electrode of the at least one transistor is electrically connected to a gate signal line, a first electrode of the at least one transistor is electrically connected to a touch sensing signal line, and a second electrode of the at least one transistor is electrically connected to an output terminal of the signal conversion unit.

2. The touch control display panel according to claim 1, wherein:
the color film substrate includes n number of touch sensing electrodes and n number of touch sensing signal lines electrically connected to the n number of touch sensing electrodes, respectively;
the signal conversion unit includes n number of input terminals and m number of output terminals;
the signal conversion unit combines the input signals received at the n number of the input terminals into m number of output signals, and transmits the m number of output signals to the m number of the output terminals, respectively; and
m and n are positive integers, and m<n.

3. The touch control display panel according to claim 2, wherein:
at least one of the m number of transistor groups includes two or more transistors; and
the second electrodes of the transistors in different transistor groups are electrically connected to different output terminals of the signal conversion unit.

4. The touch control display panel according to claim 3, wherein:
the transistor groups include an equal number of transistors; and
a number of the gate signal lines is equal to a number of the transistors in the transistor group.

5. The touch control display panel according to claim 4, wherein:
the touch sensing signal lines electrically connected to the transistors in each transistor group correspond to a group of touch sensing electrodes;
each group of the touch sensing electrodes includes a plurality of touch sensing electrodes;
a touch sensing electrode has a striped shape; and
the plurality of touch sensing electrodes in each group of touch sensing electrodes are arranged in a direction perpendicular to an extending direction of the touch sensing electrodes.

6. The touch control display panel according to claim 4, wherein:
the transistor group includes two transistors.

7. The touch control display panel according to claim 2, further comprising:
a flexible circuit board, wherein the plurality of touch sensing signal lines are electrically connected to the plurality of input terminals of the signal conversion unit through the flexible circuit board, respectively.

8. The touch control display panel according to claim 7, wherein:
the flexible circuit board includes a touch flexible circuit board and a primary flexible circuit board;
the touch sensing signal lines are electrically connected to the primary flexible circuit board through the touch flexible circuit board; and
the primary flexible circuit board is electrically connected to the n number of signal input terminals and an external driving module.

9. The touch control display panel according to claim 8, wherein:
the primary flexible circuit board is disposed on a side of the array substrate facing toward the color film substrate;
the primary flexible circuit board includes a bonding terminal and a signal input terminal;
the bonding terminal is electrically connected to the n number of the input terminals;
the signal input terminal is electrically connected to the external driving module; and
the signal conversion unit is disposed between the bonding terminal and the driving IC chip.

10. The touch control display panel according to claim 3, wherein:
the gate signal lines are electrically connected to the driving IC chip.

11. The touch control display panel according to claim 2, wherein:
the touch sensing electrodes extend in a first direction;
the n number of the touch sensing electrodes are arranged in a second direction;
the array substrate includes a plurality of touch driving electrodes;
the touch driving electrodes extend in the second direction;
the touch driving electrodes are arranged in the first direction; and
the first direction is perpendicular to the second direction.

12. The touch control display panel according to claim 11, wherein:
the touch sensing electrode and the touch driving electrode each has a striped shape.

13. A driving method for a touch control display panel comprising: a color film substrate including a plurality of touch sensing electrodes and a plurality of touch sensing signal lines electrically connected to the plurality of the touch sensing electrodes, respectively; and an array substrate arranged opposite to the color film substrate and including a driving IC chip and a signal conversion unit, wherein the signal conversion unit includes a plurality of input terminals and a plurality of output terminals, the plurality of input terminals are electrically connected to the plurality of the touch sensing signal lines, respectively, the plurality of output terminals are electrically connected to the driving IC chip, the signal conversion unit combines a plurality of input signals received at the plurality of the input terminals into a plurality of output signals, and transmits the plurality of output signals to the plurality of the output terminals, respectively, the signal conversion unit includes m number of transistor groups and a plurality of gate signal lines, each transistor group including at least one transistor, and in each transistor group, a gate electrode of the at least one transistor is electrically connected to a gate signal line, a first electrode of the at least one transistor is electrically connected to a touch sensing signal line, and a second electrode of the at least one transistor is electrically connected to an output terminal of the signal conversion unit, the driving method comprising:
in a display stage, disconnecting the touch sensing signal lines from the corresponding output terminals of the signal conversion unit; and
in a touch stage, sequentially connecting the touch sensing signal lines with the corresponding output terminals of the signal conversion unit, and receiving a plurality of signals returned from the touch sensing electrodes via the plurality of the output terminals.

14. The driving method according to claim 13, wherein the color film substrate includes n number of touch sensing electrodes and n number of touch sensing signal lines electrically connected to the n number of touch sensing electrodes, respectively; the signal conversion unit includes n number of input terminals and m number of output terminals; the signal conversion unit combines the input signals received at the n number of the input terminals into m number of output signals, and transmits the m number of output signals to the m number of the output terminals, respectively; and m and n are positive integers, and m<n, the driving method further includes:

in the display stage, disconnecting the touch sensing signal lines from the corresponding output terminals of the signal conversion unit; and in the touch stage, sequentially connecting the touch sensing signal lines with the corresponding output terminals of the signal conversion unit, and receiving n number of signals returned from the touch sensing electrodes via the m number of output terminals.

15. The driving method according to claim 14, wherein at least one of the m number of transistor groups includes two or more transistors; and the second electrodes of the transistors in different transistor groups are electrically connected to different output terminals of the signal conversion unit, the driving method further includes:

in the display stage, supplying a ground voltage signal to the gate signal line; and in the touch stage, receiving the touch sensing signals returned from the touch sensing electrodes by the signal conversion unit, and sequentially supplying a first pulse signal to the plurality of gate signal lines, wherein the first pulse signal has a first cycle period.

16. The driving method according to claim 15, further comprising:

in the display stage, a touch point is determined based on the output signal at the output terminals.

17. The driving method according to claim 15, wherein:

the touch sensing signal is a second pulse signal having a second cycle period; and the first cycle period is equal to a pulse width of the second pulse signal.

18. The driving method according to claim 17, wherein:

each transistor group includes k number of transistors, where k is a positive integer, and 1<k<n; and the first pulse signal has a duty cycle of 1/k.

19. The driving method according to claim 14, wherein the array substrate further includes a plurality of touch driving electrodes; and the touch driving electrodes intersect with the touch sensing electrodes, the driving method further includes:

in the touch stage, sequentially supplying a touch control scanning signal to the touch driving electrodes.

20. A touch control display device, comprising the touch control display panel according to claim 1.

\* \* \* \* \*